No. 613,101. Patented Oct. 25, 1898.
W. H. WILLIMON.
COMBINED FERTILIZER DISTRIBUTER AND CULTIVATOR.
(Application filed Sept. 30, 1897. Renewed Sept. 7, 1898.)
(No Model.)
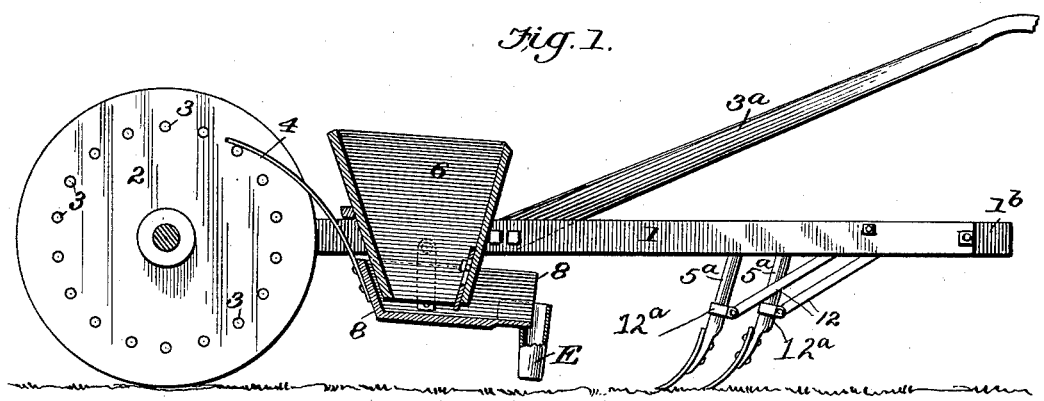
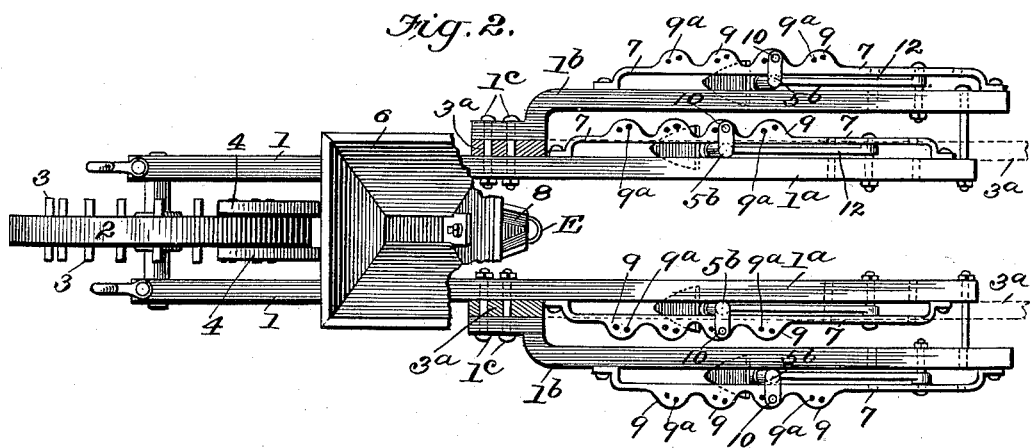
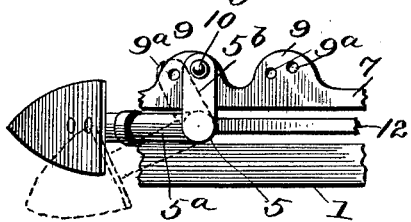
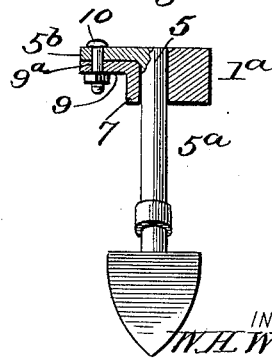
WITNESSES:
Edwin L. Bradford
INVENTOR
W. H. Willimon
BY
Fred G. Dieterich & Co.
ATTORNEYS

UNITED STATES PATENT OFFICE.

WILLIAM H. WILLIMON, OF GREENVILLE, SOUTH CAROLINA.

COMBINED FERTILIZER-DISTRIBUTER AND CULTIVATOR.

SPECIFICATION forming part of Letters Patent No. 613,101, dated October 25, 1898.

Application filed September 30, 1897. Renewed September 7, 1898. Serial No. 690,451. (No model.)

*To all whom it may concern:*

Be it known that I, WILLIAM H. WILLIMON, residing at Greenville, in the county of Greenville and State of South Carolina, have invented a new and Improved Combined Fertilizer-Distributer and Cultivator, of which the following is a specification.

This invention seeks to provide a combined fertilizer-distributer and cultivator which will effectively distribute the fertilizer-grain and thoroughly cover it after it is discharged from the hopper.

The invention also has for its object to combine with the fertilizer-distributing means a simple arrangement of coverer-plows having novel means of adjustment, whereby a whole row can be shaped up at a time, and the plows capable of being set to throw the earth in line with the line of draft or at an angle thereto, as may be found most desirable.

With these and other objects in view, which will hereinafter appear, the invention embodies the peculiar construction and novel arrangement of parts, such as will be first described in detail and then be specifically pointed out in the appended claims, reference being had to the accompanying drawings, in which—

Figure 1 is a vertical longitudinal section of my improvement. Fig. 2 is a top plan view thereof, and Figs. 3 and 4 are detail views of the plow-adjusting means hereinafter referred to.

In the practical construction my invention comprises a frame consisting of the horizontal side beams 1, the front ends of which have suitable draft connections, while the rear ends support the coverer-plows, the peculiar connection of which to the beams will be hereinafter fully set out.

2 indicates the ground-wheel, having at both sides tappets or projecting pins 3, which engage the spring-straps 4, secured to the front end of a vibrating trough 8, held pendent on the lower end of the hopper 6, supported on the side beams 1, the trough having a rearward extension and a dropping-boat E. The hopper has a vertical sliding gage, as clearly shown in the drawings. The hopper, vibrating trough, and tappet-wheel being of a well-known construction, therefore form *per se* no part of this invention.

By referring now more particularly to Fig. 2 it will be seen the side beams 1 have rear extensions $1^a$, to which are secured supplemental beams $1^b$, the bolts $1^c$ also securing the lower ends of the handles $3^a$. The beams 1 and $1^b$ have strap-plate guides 7, in which the circular shanks 5 of the plow-standards $5^a$ are held to slide longitudinally and rotatably.

By connecting the plow-standards to the beams in the manner shown it is manifest that the plows can be set up close to or away from the trough 8, it being also readily understood from the drawings that the plows can be set either in line with the draft of the machine or at an angle thereto when it is desired to throw the dirt inward to a greater degree than can be done by the ordinary setting of the plow.

As a simple means for adjusting the plows the guides 7 have horizontal ears 9, having apertures $9^a$, with which the lock-bolts 10 engage, and which are passed through the apertured extensions $5^b$ of the plow-standards. Thus by setting the plow-standard so the extension $5^b$ will register with the front aperture in the ear 9 the plows will be set at an angle to the draft to throw the dirt more directly on the hill, as indicated in dotted lines in Fig. 3.

12 indicates braces, secured at one end to the plow by the sleeve $12^a$ and at the other end adjustably in the guides 7. By connecting the lower end of the plow-standard to a sleeve carried on the lower end of the braces 12 the standards will have a free rotary movement on such braces.

If desired, the supplemental plow-beam and plows may be dispensed with.

By providing two extra plows they, with the others, can be quickly run forward or backward at will or removed entirely. With both plows in position a whole row can be shaped up at the same time and with only one operation, which in itself makes a great labor saving.

Having thus described my invention, what I claim, and desire to secure by Letters Patent, is—

1. The combination with the parallel-disposed longitudinal beams, the hopper, the ground-wheel and vibrating trough, said beams having longitudinal guideways; of the coverer-plows held to straddle the row, said plows having their shanks slidable and rotatable in the said guideways, and having braces detachably connected to the beams, and means adapted to be detachably connected to the beams for holding the plows to their rotary adjustment as specified.

2. In a fertilizer-distributer and cultivator, the combination with the distributing and dropping devices, the ground-wheel and the supporting-beams; of coverer-plows, braces therefor longitudinally adjustable on the beams, said plows having rotary adjustment on the beams and brackets, and means for holding the plows to their rotary adjustment as set forth.

3. In a machine of the class described, the combination with the opposite beams, the hopper, the ground-wheel, the vibrating dropping-trough and means for operating the same, of the guides 7, having a series of apertured ears $9^a$, the plow-standards longitudinally adjustable on the beams and having a rotary bearing between the beams and guides, said standards having means for engaging the apertured ears $9^a$, all being arranged substantially as shown and described.

4. In a machine of the class described, the combination with the ground-wheel, the hopper and dropping devices arranged substantially as shown, of the main and supplemental beams, said beams having guides, the plow-standards held in such guides for longitudinal and rotary movement, means for holding the standards in such adjustments, braces for such standards adjustably connected at the upper end on the beams and having a bearing at the lower end for the standards, all being arranged substantially as shown and for the purposes described.

5. In a combined fertilizer-distributer and cultivator, the combination with the supporting-beam having a guide 7 provided with apertured horizontal ears, of the plow-standard longitudinally and rotatably movable in the said guide 7, said standard having an apertured extension 5, and the brace 12, all being arranged substantially as shown and for the purposes described.

WILLIAM H. WILLIMON.

Witnesses:
J. F. DORROH,
W. L. GASSAWAY.